(12) United States Patent
Okazaki et al.

(10) Patent No.: US 8,163,824 B2
(45) Date of Patent: Apr. 24, 2012

(54) HIGH STYRENE SBS HOT MELT ADHESIVE

(75) Inventors: Genta Okazaki, Nara (JP); Mark D. Alper, Mukwonago, WI (US)

(73) Assignee: Bostik, Inc., Wauwatosa, WI (US)

( * ) Notice: Subject to any disclaimer, the term of this patent is extended or adjusted under 35 U.S.C. 154(b) by 0 days.

(21) Appl. No.: 12/765,667

(22) Filed: Apr. 22, 2010

(65) Prior Publication Data

US 2010/0249313 A1 Sep. 30, 2010

Related U.S. Application Data

(63) Continuation-in-part of application No. 11/541,598, filed on Oct. 2, 2006, now abandoned.

(51) Int. Cl.
*C08L 53/00* (2006.01)
*C08L 93/04* (2006.01)
(52) U.S. Cl. .......................... 524/274; 524/505
(58) Field of Classification Search .................. 524/274, 524/505
See application file for complete search history.

(56) References Cited

U.S. PATENT DOCUMENTS

| | | | |
|---|---|---|---|
| 4,526,577 | A | 7/1985 | Schmidt, Jr. et al. |
| 4,944,993 | A | 7/1990 | Raykovitz et al. |
| 5,057,571 | A | 10/1991 | Malcolm et al. |
| 5,149,741 | A | 9/1992 | Alper et al. |
| 6,391,960 | B1 | 5/2002 | Sambasivam et al. |
| 2004/0157021 | A1 | 8/2004 | Schmidt, Jr. et al. |
| 2005/0013996 | A1 | 1/2005 | Hatfield |
| 2006/0229411 | A1 | 10/2006 | Hatfield et al. |
| 2007/0088116 | A1 | 4/2007 | Abba et al. |

FOREIGN PATENT DOCUMENTS

| | | |
|---|---|---|
| EP | 1342765 | 5/2005 |
| WO | WO0075257 | 12/2000 |
| WO | WO0078886 | 12/2000 |
| WO | WO2007047232 | 4/2007 |

OTHER PUBLICATIONS

Vector 4461 Product Data Sheet.
Kristalex F100 Product Data Sheet.
Hercules resin Products Acquired by Eastman.
Taipol SBS 4202 Data Sheet.
Stereon 841A Data Sheet.
Stereon 840A Data Sheet.
Stereon 842A Data Sheet.

*Primary Examiner* — Milton I Cano
*Assistant Examiner* — John Uselding
(74) *Attorney, Agent, or Firm* — Andrus, Sceales, Starke & Sawall, LLP

(57) ABSTRACT

Multipurpose hot melt adhesive compositions which are suitable for use as both a construction and elastic attachment adhesive for disposable soft goods, such as disposable diapers, feminine sanitary napkins, surgical drapes, hospital pads, and adult incontinent products. The multipurpose hot melt adhesive compositions have a high level of creep resistance, high bond strength, and relatively low viscosity, and are composed of endblock resin in combination with a linear styrene-butadiene-styrene (SBS) copolymer wherein the copolymer has a styrene content greater than about 35% by weight, and preferably about 38% to about 50% by weight.

20 Claims, No Drawings

HIGH STYRENE SBS HOT MELT ADHESIVE

CROSS REFERENCE TO RELATED APPLICATION

This application is a continuation-in-part of application Ser. No. 11/541,598 filed Oct. 2, 2006, now abandoned.

FIELD OF THE INVENTION

The present invention relates to multipurpose hot melt adhesives and more particularly, it relates to new multipurpose SBS based hot melt adhesives which find utility in the manufacture of disposable soft goods such as diapers, feminine napkins and the like.

BACKGROUND OF THE INVENTION

The prior art is replete with numerous examples of hot melt adhesives which are employed for the construction of disposable soft goods. Specific applications for these prior art adhesives have included disposable diapers, sanitary napkins, surgical drapes, hospital pads and adult incontinent products to name but a few. Moreover, the prior art methods of application of these prior art adhesives have included, but are not limited to, extrusion (multi-bead or slot), and spray or wheel application systems.

Those skilled in the art will readily recognize that many different polymer bases have been used, heretofore, to formulate hot melt adhesives for the construction of disposable soft goods. In this regard, the first copolymers to be employed were the ethylene vinyl acetate copolymers (EVA) and amorphous polypropylene (APP). While these polymers, when properly blended, provided acceptable adhesion to most substrates, they had several shortcomings which detracted from their usefulness. One of the first shortcomings of these polymers was that they lacked the desired elevated temperature resistance. For example, it is very important that a construction adhesive, for disposable soft goods, maintain its bond, not only at room temperature, but also at elevated temperatures, that is, 100° F. (38° C.). This elevated temperature resistance is important because without this characteristic, delamination of the end product occurs if the adhesive bond comes into contact with the user's skin. A second shortcoming of the prior art adhesives which were based in whole or in part on EVA or APP is that these polymers have a tendency to "gel" or otherwise increase in viscosity, or char when subjected to typical commercial application temperatures, that is 300°-350° F. In most instances, this drawback manifests itself in the form of poor application characteristics, such as plugged equipment nozzles. Further, those skilled in the art will recognize that adhesives based upon EVA or APP cannot generally be formulated as multi-purpose adhesive compositions.

As should be understood, multi-purpose adhesive compositions are those adhesives which can be used for more than one application. For example, and in the manufacture of most disposable diapers today, it should be understood that several different adhesive applications are present. These adhesive applications include the use of adhesives in construction, that is, bonding the polyethylene to the nonwoven and absorbent pad; the use of adhesives for elastic attachment, that is, bonding the elastic material to the polyethylene in either the leg and/or waist area; the use of adhesives for landing strips, that is, bonding a reinforcing layer of polyolefin film to the polyethylene in the area opposite the tape tabs; and the use of core adhesives, that is, applying an adhesive to the absorbent core to increase the strength of the core.

Construction adhesives are soft (tacky), have high peel strength, long open time and low cohesive strength. Elastic attachment adhesives are stiffer (not as tacky), high in cohesive strength, and shorter in open time, than construction adhesives. For multipurpose applications, in particular, elastic attachment, the balance of stiffness, cohesive strength, and open time is required for good performance.

As discussed earlier, the prior art EVA and APP based adhesive compositions have not generally been compounded, heretofore, to form multi-purpose adhesives with pressure sensitive properties because these formulations were found to be severely compromised as to the strength, and elevated temperature resistance. As should be understood, pressure sensitivity is extremely important to multi-purpose adhesive compositions because a pressure sensitive adhesive will form a bond over a much wider range of application conditions, such as temperature, than a non pressure sensitive adhesive composition.

Adhesive compositions based upon styrene-isoprene-styrene (SIS) block copolymers have also been used, heretofore, in the construction of disposable soft articles. SIS is chosen because, when compared to other block copolymers, for the same melt index and rubber content, SIS polymers provide a higher molecular weight and softer adhesive products. Adhesives used for elastic attachment need to contain high amounts of rubber and endblock resin to obtain adequate cohesion. For example, U.S. Pat. No. 5,149,741 to Alper discloses elastic attachment adhesives comprising 35 parts of SIS copolymer, in combination with 10 parts endblock resin. While these adhesive compositions have been used, they also have had several noteworthy deficiencies which have detracted from their usefulness. For example, adhesive compositions employing previously commercially available SIS copolymers displayed a low modulus and poor elevated temperature resistance even when formulated with various tackifying resins. In an attempt to improve the temperature resistance of the various SIS based compositions, endblock reinforcing resins were blended therewith. However, these resins appeared to decrease the specific adhesion of the adhesive compositions to polyolefin substrates and also raised the raw material cost of the final adhesive composition inasmuch as these reinforcing resins are generally quite expensive. Moreover, it appeared that, with respect to maintaining any significant degree of elevated temperature resistance, adhesive compositions containing SIS copolymers require relatively non-polar tackifying resins, that is, partially or totally hydrogenated resins or aliphatic C-5 resins. However, it became evident following experimentation that resins containing a significant amount of polar or aromatic components tended to associate with the endblock of the block copolymer, and thereby decreased the elevated temperature resistance to unacceptable levels. As a result, and when adhesive compositions were compounded using SIS copolymers and these relatively non-functional resins, the resultant adhesive compositions had what was considered very poor adhesion to polyolefin substrates. While these same adhesive compositions were acceptable for use as elastic attachment adhesives, that is, where a high level of specific adhesion is not generally needed, they further appeared completely unsuitable for use as construction adhesives, that is, where a very high level of specific adhesion to polyolefin substrates was mandatory. Moreover, these same compounds tended to yield products with undesirably high viscosities at application temperatures.

As a result of the foregoing, adhesive compositions based upon SIS copolymers are not always suitable for use as multipurpose adhesives.

In addition to the prior art adhesives discussed above, adhesives based on styrene-butadiene-styrene (SBS) multi-block copolymers were suggested for use in the construction of disposable soft goods. An example of these prior art adhesives is disclosed in U.S. Pat. No. 4,526,577. The SBS based adhesive compositions appeared to be improvements over the previously employed adhesives in several important respects, but they also had several drawbacks which detracted from their usefulness. For example, it was discovered that when an SBS based adhesive composition was left in an adhesive applicator for an extended period of time, it would rapidly increase in viscosity and ultimately gel thereby making it extremely difficult to remove. In addition, adhesive compositions based upon SBS multi-block copolymers did not have sufficient elevated temperature creep resistance to perform well as an elastic attachment adhesive as compared with adhesive compositions based upon the styrene-isoprene-styrene (SIS) block copolymers. Furthermore, many diaper manufacturers have recently added an elastic waistband to their disposable diaper products, and the SBS based adhesive compositions disclosed in this patent appear completely unacceptable for this particular manufacturing application. This is due to insufficient elevated temperature creep resistance.

In order to provide a higher level of creep resistance, U.S. Pat. No. 6,391,960 describes the use of an endblock resin in combination with a relatively high molecular weight radial or linear SBS copolymer as a multipurpose hot melt adhesive. It is stated therein that the presence of the endblock resin provides for a higher cohesion at lower viscosity, when compared to adding more copolymer to the composition to obtain the same increased level of cohesion. It is also stated that the presence of the high molecular weight SBS copolymer allows use of a lower amount of the copolymer which provides a softer, more pressure sensitive adhesive, with longer open time, when compared to use of a low molecular weight SBS copolymer. However, the use of these high molecular weight polymers leads to finished hot melt adhesives with unacceptably high viscosities.

It is desirable to keep the viscosity of the hot melt adhesive low to allow for low application temperatures, particularly when using spray equipment. This is especially necessary when applying the adhesive to heat sensitive substrates, such as the polyethylene backsheet typically used to manufacture disposable diapers.

Low viscosity hot melts can be made by using relatively low molecular weight linear SBS polymers, as described herein. The advantage of using lower molecular weight polymers, compared to the high molecular weight polymers used in U.S. Pat. No. 6,391,960, is lower viscosity of the finished adhesive, all else being equal.

However, as the overall polymer molecular weight decreases, it becomes more difficult for the endblock resin to stay incorporated in the styrene domain of the polymer. This is because as the polymer molecular weight decreases, so does the molecular weight of the styrene domain.

Therefore, it is desirable to keep the molecular weight of the styrenic endblock of the polymer as high as possible relative to the overall molecular weight of the block copolymer. This in part is achieved by keeping the styrene content high in the SBS block copolymer, for example, higher than 35 percent by weight.

Suitable endblock molecular weights can also be achieved when using linear block copolymers instead of radial. At a given polymer molecular weight, linear block copolymers have a higher relative endblock molecular weight than a corresponding radial polymer. For example, the general structure of a linear block copolymer made via a coupling reaction would be A-B—X—B-A, where A is styrene, B is butadiene and X is a di-functional coupling agent. If a similar radial polymer was made using a tetra-functional coupling agent, the structure would be $(A-B)_4$—X. In this example, the molecular weight of the linear polymer would be twice that of the radial polymer. At very low polymer molecular weights, for example, where the toluene viscosity (25 weight percent polymer in toluene) is less than 1000 centipoise, the beneficial effect of aromatic endblock reinforcing resins would therefore be more pronounced in linear versus radial SBS polymers.

The unique combination of low polymer molecular weight combined with high styrene content and linear polymer architecture results in a low viscosity hot melt adhesive with excellent elastic attachment performance.

As used herein, the "midblock" of the polymer refers to polymeric blocks which are substantially aliphatic. As will be discussed below, "midblock resin" refers to a tackifier which is compatible with the midblock of the polymer. "Endblock" of the polymer refers to polymeric blocks which are substantially aromatic. "Endblock resins," as will be discussed in detail below, are substantially aromatic and compatible with the endblock of the polymer.

Malcolm U.S. Pat. No. 5,057,571 discloses an adhesive for elastic attachment comprising low content of a very high molecular weight SBS copolymers. However, these very high molecular weight polymers can be very difficult to compound in typical hot melt production equipment. In addition, at very low polymer concentrations, the adhesive tends to become "glassy" since very high resin loadings are required.

As discussed above, endblock resins are commonly used with SIS to improve cohesive strength in pressure sensitive adhesives. Endblock resins are not commonly used with SBS because it is difficult to ensure that the resin actually incorporates in the endblock due to the higher polarity of the butadiene midblock compared to isoprene midblock, which therefore tends to solubilize the endblock resin in the midblock to a large extent. In addition, endblock resins are not commonly used in SBS-based elastic attachment adhesives. However, Raykovitz U.S. Pat. No. 4,944,993 discloses low molecular weight, radial SBS polymers comprising a styrene content greater than 35% with an endblock resin, and their use in construction and elastic attachment adhesives.

SUMMARY OF THE INVENTION

The present invention is directed to multipurpose hot melt adhesive compositions which are suitable for use as both a construction and elastic attachment adhesive for disposable soft goods, such as disposable diapers, feminine sanitary napkins, surgical drapes, hospital pads, and adult incontinent products. The multipurpose hot melt adhesive compositions have a high level of creep resistance, high bond strength, and relatively low viscosity, and are composed of endblock resin in combination with a linear styrene-butadiene-styrene (SBS) copolymer wherein the SBS copolymer has a styrene content greater than about 35% by weight, and preferably about 38% to about 50% by weight. In addition, the SBS copolymer used in the present composition has a melt flow index (MFI) of about 3 g/10 min to about 11 g/10 min, preferably about 3 g/10 min to about 8 g/10 min, as measured according to ASTM D-1238 with a 5 kg weight at 374° F. (190° C.), and a polydispersity (PD=weight average molecular weight divided by number average molecular weight) of about 1.01 to about 1.30, preferably about 1.01 to about 1.20, and most preferably about 1.01 to about 1.10. The SBS copolymer should also have a weight average molecular weight (Mw) of 100,000 or greater, as determined by ASTM D-5296-97. As a result, the adhesive compositions of the present invention have a cold flow value (CFV) equal to or greater than 70%, preferably equal to or greater than 80%, and most preferably equal to or greater than 90%, as measured according to the cold flow test method described herein after 48 hours at 120° F. (49° C.), resulting in a relatively long open time, low stiffness and good cohesive strength which properties are advantageous for an effective multipurpose adhesive.

The adhesive compositions are very suitable for bonding of elastic to polyethylene and/or polypropylene films, tissue and/or non-woven substrates to form gathered waist, leg, or sleeve bands in a disposable soft goods article. Additionally, the combination of relatively high cohesive strength of the adhesive coupled with relatively low viscosity provides a superior adhesive for application to such substrates using conventional spray fiberization techniques wherein it is desirable to be able to spray the molten adhesive in various patterns without disruption of the continuous adhesive filament. Advantageously, it has been found that the use of at least 35%, and generally up to about 50%, by weight of styrene in a linear SBS block copolymer provides a much lower viscosity at an equivalent temperature to an SBS block copolymer that contains lower amounts of the styrene moiety. This allows for a lower application temperature, which in turn, avoids burn through when the adhesive is applied to polyethylene, polypropylene and/or the elastic strands. In addition, the lower application temperatures of the present adhesives avoid problems relating to heat degradation of the adhesive since the application temperatures are lower than previously required with other SBS block copolymers.

More specifically, the adhesives of the present invention include:

(A) About 5% to about 40% by weight of a substantially linear styrene-butadiene-styrene block copolymer having a styrene content greater than 35% by weight, a melt flow index (MFI) of about 3 g/10 min to about 11 g/10 min, preferably about 3 g/10 min to about 8 g/10 min, and a polydispersity (PD=$M_w/M_n$) of about 1.01 to about 1.30, preferably about 1.01 to about 1.20, and most preferably about 1.01 to about 1.10;

(B) About 2% to about 30% by weight of a substantially aromatic endblock resin;

(C) About 20% to about 70% by weight of at least one compatible tackifying resin;

(D) About 0% to about 25% by weight of a compatible non-functionalized block copolymer;

(E) About 0% to about 30% by weight of a plasticizer; and (F) About 0% to about 4% by weight stabilizer, the above components, together with any additional optional additives that may be incorporated into the hot melt adhesive composition in order to modify certain properties thereof, e.g. colorants such as titanium dioxide, fillers such as talc or clay, and minor amounts of wax, comprise 100% by weight of the adhesive composition. The tackifier is preferably present in an amount greater than the block copolymer, and the adhesive has a viscosity less than 10,000 cP, preferably 8,000 cP or less, at 325° F.

DETAILED DESCRIPTION OF THE INVENTION

The present invention is directed to a multipurpose hot melt adhesive based on a linear SBS polymer with a styrene content greater than about 35% by weight and an endblock resin. The linear SBS polymer may be present in amounts ranging from 5% to 40% by weight, preferably 10% to 30% by weight, and most preferably 15% to 25% by weight.

The polymers useful in the hot melt adhesive of the present invention are block or multi-block copolymers having one of the following general configurations:

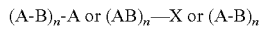

wherein X is a multivalent coupling agent with functionality of two, and polymer blocks A are non-elastomeric polymer blocks and polymer blocks B are elastomeric polymer blocks of butadiene which has not been hydrogenated. Variable "n" is an integer equal to, or greater than, one. Copolymers useful in the present invention are substantially linear. Some level of diblock copolymer, AB, may be present by design or due to incomplete coupling of the AB arms. Diblock can be beneficial for increasing tack, peel and open time, but this must be counterbalanced with its effect of lowering cohesive strength and elevated temperature resistance. Diblock level will in general be below 30%, preferably less than 15%.

An example of a multivalent coupling agent, "X", with a functionality of 2 is dibromoethane Alternatively, the polymer can be made using a sequential polymerization process, which does not use a coupling agent. This process can result in a polymer that has essentially no diblock.

The non-elastomeric blocks A may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include styrene, vinyl toluene, vinyl xylene, ethyl vinyl benzene as well as dicyclic monovinyl compounds such as vinyl naphthalene and the like. Other non-elastomeric polymer blocks may be derived from alpha olefins, alkylene oxides, acetals, urethanes, etc. Styrene is preferred, in an amount comprising more than 35 weight percent of the total copolymer composition, and more preferably 38 to 50 weight percent.

The elastomeric block component, B, making up the remainder of the copolymer is butadiene, which has not been hydrogenated.

Most preferred for use herein are the linear A-B-A triblock copolymers where the elastomeric block is butadiene and the non-elastomeric block is styrene, and wherein the copolymer has a molecular weight such that the solution viscosity (25 weight percent of polymer in toluene) is less than 1000 centipoise and a diblock content of essentially zero.

Typical of the rubbery block copolymers useful herein are the polystyrene-polybutadiene-polystyrene. Depending on the polymerization conditions, the polybutadiene midblock will contain different ratios of cis-1,4; trans-1,4; and 1,2 addition. Higher levels of 1,2 addition may be desirable to lower the viscosity for a given molecular weight. These copolymers may be prepared using methods familiar to one of ordinary skill in the art. Alternatively, these polymers may be obtained from TSRC Corporation of Taiwan under the tradename Taipol 4202, with a styrene content of 40%, a solution viscosity of 620 centipoise, a Melt Flow of 7.5 grams per 10 minutes at 190° C. using a 5 kilogram weight and a diblock content of essentially zero.

In addition, the SBS copolymer used in the present composition has a melt flow index (MFI) of about 3 g/10 min to about 11 g/10 min, preferably about 3 g/10 min to about 8 g/10 min, as measured according to ASTM D-1238 with a 5 kg weight at 374° F. (190° C.), and a polydispersity (PD=$M_w/$ $M_n$=weight overage molecular weight divided by number average molecular weight) of about 1.01 to about 1.30, preferably about 1.01 to about 1.20, and most preferably about 1.01 to about 1.10.

Blends of these styrene containing copolymers with up to about 25%, preferably less than 10%, of other compatible non-functionalized block copolymers may also be employed. By the term "non-functionalized" is meant block copolymers which are not chemically modified so as to contain functional groups such as epoxy, anhydride, silane, sulfonate, amide or the like on the copolymer backbone. Useful compatible copolymers include those prepared using isoprene or butadiene elastomeric midblocks, whether hydrogenated or not, such as those available from Kraton Polymers LLC under the Kraton trademark. Particularly useful is that designated Kraton 1165.

While the optimum amounts of the copolymer used in the adhesive will vary depending on the end use application, the copolymer will generally be present in the adhesive formulation at a level less than 40%, but generally greater than 5%, more often greater than 10%, and up to about 30% by weight, and most preferably about 15 to 25% by weight. Since the copolymer used in the hot melt adhesive of the present invention is of relatively high molecular weight, only a small amount needs to be used, resulting in a long open time and soft product.

The hot melt adhesive compositions of the present invention also comprises a solid tackifier which is compatible with the midblock of the SBS copolymer. Representative resins include the $C_5/C_9$ hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of terepene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Mixtures of two or more of the above described tackifying resins may be required for some formulations. Also included are the cyclic or acyclic $C_5$ resins and aromatic modified acyclic or cyclic resins. Preferred is an aromatic modified cyclic or an acyclic $C_5$ resin.

The tackifying resin should have a Ring and Ball softening point of between 85° C. and 125° C. More preferably the softening point is between about 95° C. and 115° C. A preferred tackifier is a hydrogenated aromatic modified dicyclopentadiene resin with a Ring and Ball softening point between about 100° C. to 115° C. These resins are available from ExxonMobil Chemical Company under the tradenames Escorez 5600 and 5615, with softening points of 100° C. and 115° C., respectively.

The tackifiers, also referred to as "midblock resins", are generally present in the adhesive compositions in an amount greater than the amount of the block copolymer. Within this range, amounts of 20 to 70% by weight of the composition, preferably 40 to 65 weight percent are utilized, and most preferably 50 to 62 weight percent.

The present invention also includes 2 to 30 weight percent of an endblock resin which is substantially aromatic. Examples of such endblock resins can be prepared from any substantially aromatic monomers having a polymerizable unsaturated group. Typical examples of such aromatic monomers include the styrenic monomers, styrene, alphamethyl styrene, vinyl toluene, methoxy styrene, tertiary butyl styrene, chlorostyrene, etc., coumarone, indene monomers including indene, and methyl indene. The aromatic endblock resin is preferably present in amounts of 5 to 20 weight percent. The Ring and Ball Softening Points of the aromatic endlbock resin is preferably between 100° and 160° C. More preferably, the softening point is between about 100° and 140° C. and most preferably between about 120° C. and 140° C. Two preferred examples are Plastolyn 240 and Plastolyn 290 available from Eastman Chemical. They have Ring and Ball Softening Points of 120° C. and 140° C., respectively.

The hot melt adhesive of the present invention also comprises 0 to 30, preferably 5 to 20, weight percent of an oil diluent. Suitable plasticizing or extending oils or liquid tackifiers include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30%, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. A preferred example is a USP grade of mineral oil available from Sonneborn, Inc. under the tradename Kaydol The hot melt adhesive of the present invention also comprises 0 to 4 weight percent, preferably, 0.3 to 3.0 weight percent, of an antioxidant. Among the applicable stabilizers or antioxidants included herein are the hindered phenols or hindered phenols in combination with a secondary antioxidant such as distearyl thiodipropionate ("DSTDP") or dilauryl thiodipropionate ("DLTDP"). Hindered phenols as used herein are as phenolic compounds containing sterically bulky radicals in close proximity to the phenolic hydroxyl group thereof. The presence of these sterically bulky substituted radicals in the vicinity of the hydroxyl group serves to retard its stretching frequency and, correspondingly, the reactivity; this steric hindrance provides the phenolic compound with its stabilizing properties. Representative hindered phenols include: 1,3,5-trimethyl 2,4,6-tris(3,5-di-tert-butyl-4-hydroxybenzyl)benzene; pentaerythrityl tetrakis-3(3,5-di-tert-butyl-4-hydroxyphenyl)propionate; pentaerythritol tetrakis (3-lauryl thiodipropionate); n-octadecyl-3,5-di-tert-butyl-4-hydroxyphenol)-propionate; 4,4'-methylenebis(2,6-tert-butylphenol); 4,4'-thiobis(6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)ethyl 3,5-di-tert-butyl-4-hydroxy-benzoate; and sorbitolhexa[3-(3,5-di-tert-butyl-4-hydroxyphenyl)-propionate]. Preferred antioxidants are SUMILIZER TDP, a secondary antioxidant available from Sumitomo Chemical Company and IRGANOX 1010 a hindered phenol primary antioxidant available from Ciba-Geigy. The stabilizer is preferably present in amounts of 0.3 to 3% by weight, more preferably 0.3 to 1.5%, and most preferably 0.5%.

Optional additives (up to 50% by weight) may be incorporated into the hot melt compositions depending on the end use of the composition. Among these additives may be included colorants such as titanium dioxide; fluorescent agents; and fillers such as talc, clay, calcium carbonate, silica, mica, wollastonite, feldspar, aluminum silicate, alumina, hydrated alumina, glass microspheres, ceramic microspheres, thermoplastic micropheres, baryte and wood flour, as well as minor amounts (e.g., less than about 5%) of a wax such as a petroleum derived wax, a synthetic wax or a polyolefin wax.

One embodiment of the present invention is a multipurpose hot melt adhesive comprising:

(a) 5 to 40 weight percent of a substantially linear styrene-butadiene-styrene block copolymer having a styrene content greater than about 35% by weight, a melt flow index (MFI) of about 3 g/10 min to about 11 g/10 min, preferably about 3 g/10 min to about 8 g/10 min, and a polydispersity (PD=$M_w/M_n$) of about 1.01 to about 1.30, preferably about 1.01 to about 1.20, and most preferably about 1.01 to about 1.10;

(b) 2 to 30 weight percent endblock resin prepared from any substantially aromatic monomers having a polymerizable unsaturated group;

(c) 20 to 70 weight percent of a tackifier;

(d) 0 to 25 weight percent of a compatible non-functionalized block copolymer;

(e) 0 to 30 weight percent oil; and (f) 0 to 4 weight percent antioxidant, wherein the tackifier is present in an amount greater than the block copolymer and wherein the adhesive has a viscosity less than 10000 cP at 325° F., and a cold flow value (CFV) equal to or greater than 70%, preferably equal to or greater than 80%, and most preferably equal to or greater than 90%.

In another embodiment the adhesive comprises:

(a) 5 to 40, preferably 10 to 35, weight percent of a substantially linear styrene-butadiene-styrene block copolymer having a styrene content greater than about 38% by weight, a melt flow index (MFI) of about 3 g/10 min to about 11 g/10 min, preferably about 3 g/10 min to about 8 g/10 min, and a polydispersity (PD=$M_w/M_n$) of about 1.01 to about 1.30, preferably about 1.01 to about 1.20, and most preferably about 1.01 to about 1.10;

(b) 2 to 30 weight percent of the endblock resin;

(c) 20 to 70 weight percent of a tackifier;

(d) 0 to 25 weight percent of a compatible non-functionalized block copolymer;

(e) 0 to 30 weight percent oil; and (f) 0 to 4 weight percent antioxidant wherein the tackifier is present in an amount greater than the block copolymer and wherein the adhesive has a viscosity less than 8000 cPs at 325° F., and a cold flow value (CFV) equal to or greater than 70%, preferably equal to or greater than 80%, and most preferably equal to or greater than 90%.

In a further embodiment the adhesive comprises:

(a) 10 to 30 weight percent of a substantially linear styrene-butadiene-styrene block copolymer having a styrene content greater than 35% and preferably between about 38% to about 50% by weight, a melt flow index (MFI) of about 3 g/10 min to about 11 g/10 min, preferably about 3 g/10 min to about 8 g/10 min, and a polydispersity (PD=$M_w/M_n$) of about 1.01 to about 1.30, preferably about 1.01 to about 1.20, and most preferably about 1.01 to about 1.10;

(b) 5 to 20 weight percent endblock resin;

(c) 45 to 65 weight percent of a tackifier;

(d) 0 to 30 weight percent oil; and (e) 0 to 3 weight percent antioxidant.

In a preferred embodiment, the present invention is directed to a multipurpose hot melt adhesive comprising:

(a) 15 to 25 weight percent of a substantially linear styrene-butadiene-styrene block copolymer having 40% styrene by weight, a melt flow index (MFI) of about 3 g/10 min to about 11 g/10 min, preferably about 3 g/10 min to about 8 g/10 min, and a polydispersity (PD=$M_w/M_n$) of about 1.01 to about 1.30, preferably about 1.01 to about 1.20, and most preferably about 1.01 to about 1.10;

(b) 5 to 25 weight percent aromatic endblock resin;

(c) 45 to 65 weight percent of a tackifier;

(d) 5 to 20 weight percent oil; and (e) 0.3 to 1.5 weight percent antioxidant wherein the tackifier is present in an amount greater than the block copolymer and wherein the adhesive has a viscosity less than 8000 cP at 325° F., and a cold flow value (CFV) equal to or greater than 70%, preferably equal to or greater than 80%, and most preferably equal to or greater than 90%.

The resultant adhesives may be used in the assembly or construction of various disposable articles including, but not limited to, disposable diapers, disposable feminine products, adult incontinent products, hospital gowns, bed pads and the like. In particular, adhesives are useful for the assembly of disposable articles wherein at least one polyethylene or polypropylene substrate is bonded to at least one tissue, nonwoven, polyethylene or polypropylene substrate. In addition, the adhesives are useful in the bonding of elastic to polyethylene, polypropylene or nonwoven substrate so as, for example, to impart elongation resistant gathers thereto. The adhesive may also be utilized in less demanding disposable construction applications such as for end or perimeter sealing.

The viscosity of the resulting adhesive formulation will be less than 10,000 cP at 325° F., allowing for use with most conventional adhesive application machinery. In a more preferred embodiment, the viscosity of the adhesive formulation of the present invention will be less than 8,000 cP, providing the adhesive with excellent sprayability and processability.

A preferred composition for a hot melt adhesive in accordance with the present invention, which is sprayable and suitable for elastic attachment, will have a viscosity less than 10,000 cP at 325° F. and preferably the substantially linear SBS block copolymer comprises greater than 35% styrene.

A more preferred composition for an elastic attachment adhesive in accordance with the present invention, will have a viscosity less than 8,000 cP at 325° F., and preferably the substantially linear SBS block copolymer comprises greater than 38% styrene and essentially zero percent diblock.

The adhesive formulations of the present invention, in addition to being suitable for elastic attachment, may have a long open time and high pressure sensitivity allowing them to be very good as a construction adhesive.

The following examples are merely illustrative and not intended to limit the scope of the present claims in any manner.

EXAMPLES

The adhesives of the invention were prepared using the following procedure:

The adhesive composition useful in the method of the present invention may be produced using any of the techniques known in the art. A representative example of the procedure involves placing all of the liquid substances in a jacketed mixing kettle and preferably in a jacketed heavy duty mixer of the Baker-Perkins or Day type, and which is equipped with rotors, and thereafter raising the temperature of this mixture to a range of 120° C. to 177° C. The solid tackifying resins and other additives are then added and melted to form a homogeneious mixture. Finally, the polymer is added and mixed until completely blended in. It should be understood that the precise temperature to be used in this step would depend on the melting point of the particular ingredients and the viscosity of the finished adhesive. The resulting adhesive composition is agitated until the polymers completely dissolve. A vacuum is then applied to remove any entrapped air.

The following materials were used:

Escorez 5600 is a hydrogenated aromatic modified cycloaliphatic hydrocarbon resin with a 100° C. softening point. It is available from ExxonMobil Chemical.

Plastolyn 290 is a pure aromatic monomer resin with a 140° C. softening point available from Eastman Chemical Co.

Steron 842A is a styrene-butadiene multiblock copolymer believed to have about 43% styrene and about 57% butadiene available from Firestone Synthetic Rubber and Latex Co.

Vector 4461 is a linear styrene-butadiene-styrene triblock copolymer available from Dexco Polymers LP. It is a high styrene and low molecular weight copolymer having essentially zero percent diblock content. It has the following properties:

| Properties | Test Method | Unit | Typical Value |
|---|---|---|---|
| SBS [1] Resin Properties | | | |
| Styrene | Dexco Method | Wt. % | 43 |
| Diblock Content | Dexco Method | Wt. % | <1 |
| Melt Flow Rate [2] | ASTM D 1238 | g/10 min. | 23 |
| Ash | ASTM D 1416 | Wt. % | 0.5 |
| Physical Properties | | | |
| Tensile Strength [3] | ASTM D 412 | PSI | 4500 |
| 300% modulus [3] | ASTM D 412 | PSI | 1200 |
| Elongation [3] | ASTM D 412 | % | 700 |
| Hardness [4] | ASTM D 2240 | Shore A | 87 |
| Bulk Density | Dexco Method | lb./cu.ft. | 27 |
| Specific Gravity | ASTM D 792 | g/cc | 0.96 |
| Product Form | | | Porous Pellet |

[1] "SBS" denotes linear, styrene-butadiene-styrene triblock copolymer
[2] Condition (200° C./5 kg).
[3] Typical values on compression molded plaques, intended only as guides, and should not be construed as specifications.
[4] 1 sec. dwell.

Taipol 4202 is a linear block copolymer with 40% styrene and 60% butadiene available from TSRC Corp. It has essentially zero percent diblock content. The solution viscosity in toluene at 25 weight percent is 620 centipoise. The melt flow (ASTM 1238) is 7.5 grams/10 minutes at 190° C. using a 5 kg. weight.

Kaydol is a white mineral oil available from Sonneborn, Inc.

Irganox 1010 is a hindered phenolic antioxidant. It is available from Ciba Specialty Chemicals.

H2598 is a high styrene SIS based elastic attachment adhesive. It is available commercially from Bostik, Inc. located in Wauwatosa, Wis.

The following tests were performed on the adhesives to determine the viscosity, softening point, cold flow value (CFV), and creep resistance for elastic attachment.

Viscosity

Viscosity measurements were made according to ASTM Method D3236 in a Brookfield viscometer and are shown in centipoise (cP) units.

The resulting hot melt adhesives may be then applied to substrates using a variety of application techniques. Examples includes hot melt glue gun, hot melt slot-die coating, hot melt wheel coating, hot melt roller coating, melt blown coating, spiral spray and the like. In a preferred embodiment, the hot melt adhesive is sprayed onto a substrate using spiral spray, which is a preferred technique to produce a filamentary spiral pattern for elastic attachment and construction in diaper manufacturing. In one example, a hot melt coater is equipped with a disc like coating die which has a nozzle tip in the center. The tip is surrounded with a series of inclined orifices for hot air jets to pass through. The hot melt adhesive is pumped out of the nozzle in the form of a fine filament. The filament is then rotated by high-velocity hot air jets coming out of the orifices, thereby producing a helical pattern from a single strand of adhesive which is transported to the substrate. It is not the intent of this invention to provide a full description of spray techniques and the details can be found in the literature.

For the present invention, preferred methods of applying the adhesive would be by spray application, most preferably assisted by air. Among these techniques, the most common are spiral spray (Controlled Fiberization™ by Nordson), Summit™ by Nordson, Surewrap™ by Nordson, Omega™ by ITW and various melt blown processes. For the present invention, the temperature at which the hot melt adhesive is applied should be below 170° C., so that the heat sensitive substrates will not be damaged. Preferably, this temperature should be equal to or lower than 160° C., most preferably lower than 150° C.

The adhesive composition of the present invention may be used in a number of applications such as, for example, in disposable nonwoven hygienic articles, paper converting, flexible packaging, wood working, carton and case sealing, labeling and other assembly applications. Particularly preferred applications include disposable diaper and feminine sanitary napkin construction, diaper and adult incontinent brief elastic attachment, diaper and napkin core stabilization, diaper backsheet lamination, industrial filter material conversion, surgical gown and surgical drape assembly, etc. The adhesives of the present invention are particularly suited as elastic attachment adhesives for use on disposable diapers, training pants and adult incontinent products.

Cold Flow Method

Purpose:
  To evaluate the cold flow of hot melt adhesive at various temperatures.

Definitions
  Cold Flow: The distortion, deformation, or dimensional change, which takes place in materials under continuous load at temperatures within the working range.
  Mold: Used to collect a sample of hot melt adhesive for testing which consists of 2 cubes that are 1"×1"×1".
  Hot Melt Adhesive: Is a thermoplastic substance that can hold or bond materials together. It is applied when molten, and forms a bond upon cooling to a solid state.
  Hot Knife: Also called a putty knife or paint scrapper. Varies in width from 1-3 inches.

Steps:
  Pour the molten hot melt into the cube mold. If the hot melt is very viscous, or if problems arise so that it cools too quickly while pouring, it may help to warm the mold in a 120-130° F. oven before pouring. Enough hot melt will need to be poured to fill at least two cubes.

The best results are when the samples are prepared while the hot melt is still very hot. Prepare the hot melt cubes by first heating a hot knife, heated by either placing it on a hot plate, or by using a torch.

Hold the hot knife flat across the top of the cube mold. Gently swirl the hot knife across the top of the mold, evening out the distributions of the hot melt. DO NOT push or pull the hot knife across the mold, excessive concaving occurs and will affect the results later on.

Once the hot melt reaches room temperature, place the mold with the hot melt in a freezer for 15-20 minutes.

Once the hot melt is frozen, remove from freezer. Carefully remove frozen hot melt cubes from the mold.

Using a razor blade, carefully trim away any rough edges along the top of the cube.

Place the cube on a plain white cardboard stock. If testing more than one sample, place samples at least 5 cm apart. Trace the edges of the cube on the white cardboard with a fine tipped pen.

Repeat the above step for the second cube, placing it on a separated piece of white cardboard stock.

There are now 2 boards. Label each board with the hot melt that is on it, and assign the board one of the running temperatures of 120° F. or 140° F.

Place the white cardboard with cubes into the respective ovens. The cubes will be aged for 48 hours and checked twice, once at 24 hours and again at 48 hours. Measure the height of the cube each time it is checked. Record, and calculate the flow of the cube.

Calculation: Flow=(Measured height after heating/ Original Height)×100

Creep Resistance

Creep Resistance test was carried out with the laminated specimens of the Examples herein later described. The specimen, cut to about 350 mm in length, was stretched out completely and its ends were securely attached to a piece of rigid corrugated paperboard. A length of 300 mm was marked and the elastic strands were cut at the marks. The specimen was then placed in an air-circulating oven at 100° F. Under these conditions, the elastic strands under stretch can retract to a certain distance. The distance between the ends was measured after four hours. The ratio of the final length to the initial length, defined as Creep Retention and expressed in percentage (%), is a measure of the ability of the adhesive to hold the elastic strands.

Specimens for Creep Retention test were formed by using spiral spray technique on Meltex CT225 hot melt coater which was fitted with a 0.018" spiral spray nozzle. To prepare the specimens, three elastic strands (Lycra 740), which were stretched to 300% elongation, were laminated between a layer of 1.0 mil thick polyethylene film and a layer of polypropylene spunbond nonwoven fabric. Sprayability was evaluated during the coating process by observing the shape of the spiral pattern. Adhesives were spiral sprayed at 12 and 18 grams per square meter (g/m$^2$) coating weight with 0.25 seconds open time and 1 bar compression at the nip rolls and the application temperature was set at 160° C.

Weight average molecular weight (Mw) is the molecular weight of polymers determined by methods which depend upon the weights of molecules present, such as light scattering, sedimentation equilibrium, or viscosity. See ASTM D 5296-97 for the standard test method for calculating molecular weight.

Number average molecular weight (Mn) is the molecular weight of polymers determined by methods which depend upon the number of molecules present, such as titration of end groups or osmotic pressure methods. See ASTM D 5296-97 for the standard test method for calculating molecular weight.

Mw and Mn are usually not the same for any given sample of polymer. Both, of course, represent the average of the molecular weight of all of the molecules present in the sample.

Molecular weight distribution is the relative amounts of polymers of different molecular weights that comprise a given specimen of polymer. Two samples of the same polymer with the same Mw or Mn may perform quite differently in processing because of different molecular weight distribution. The ratio Mw/Mn is a convenient approximate indication of the molecular weight distribution of a specific polymer, and is referred to as the "polydispersity" (PD) of the polymer.

Many factors contribute to the structure of a particular polymer specimen. The molecular weight may cover a broad or a narrow spectrum. Individual monomers in a copolymer may be randomly distributed or in block formation, or there may be a mixture of both. There may be a large number of vinyl, cis or trans groups and these may be distributed randomly or be relatively concentrated in a particular molecular weight fraction. Such values as Mw, Mn and molecular weight distribution may vary appreciably in polymers produced from the same chemical monomers.

Factors such as molecular weight, molecular weight distribution and percent comonomer in copolymers are generally regarded as macrostructure factors. Factors such as distribution of a monomer in a particular molecular weight fraction or distribution of double bonds in the cis, trans or vinyl configuration in either the low molecular weight fraction or the high molecular weight fraction are regarded as microstructure factors.

Synthetic rubbers may be prepared by solution polymerization or by emulsion polymerization utilizing procedures well known in the art. These procedures may be adapted to produce products with widely diverse macrostructure or microstructure. Copolymers of butadiene and styrene, for example, can be prepared in which the molecular weight distribution can be as low as 1.01 or as high as 30. The molecular weight may vary from as low as 25,000 to as high as 1,000,000 or higher. Substantially all of the styrene may be in the low or the high molecular weight fraction. Of the double bonds present, as low as 1% or substantially all may be cis, trans or vinyl. The major proportion of the double bonds in a particular configuration may be in the low molecular weight fraction, the high molecular weight fraction, or they may be randomly distributed. These results can be achieved by varying such reaction conditions as temperature, time, rate of mixing, order of mixing, catalyst, and the like, and the art is well aware of these methods and procedures.

It is also possible to obtain rubber compositions with diverse microstructure or macrostructure by blending independently prepared synthetic rubbers. For example, a butadiene homopolymer of low molecular weight with most of the double bonds in the vinyl configuration can be blended with a sample in which the vinyl bonds are randomly distributed to produce a final blend in which a major proportion of the double bonds present are in molecules of relatively low molecular weight.

The molecular weight distribution of commercial polymers is normally quite broad. The ratio of Mn:Mw is typically two or greater. One of the principal reasons for this is that it is less expensive and requires less complicated manufacturing techniques to produce such polymers. Moreover polymers with wide molecular weight distribution may have improved processing properties compared with those having narrow distributions. However, a polymer with a narrow molecular weight distribution may provide other desired advantages such as high modulus, low creep resistance, excellent cohesive strength, and good melt processability. In particular, it has been discovered that they are well suited for use in hot melt adhesives requiring high strength and low viscosity.

Stated another way, polymers which have the same molecular weight, but different molecular weight distributions will have different performance characteristics in the same application. For example, a polymer with a PD of 5 will not necessarily perform and/or function the same as a polymer with a PD of 1.1 in an otherwise identical formulation and application.

Example 1

Referring to Table 1, Examples 1, 2 and 3 are formulations made according to the present invention. These three formulations based on a linear SBS block copolymer with high styrene content are compared to H2598 which is a commercially available high styrene SIS based elastic attachment adhesive. Table 1 illustrates that the viscosity at 160° C. of Examples 1, 2 and 3 is advantageously less than H2598. The adhesives of Examples of 1-3 were found to have low melt viscosity, good sprayability and excellent creep retention properties. They also have lower softening points than the control, which may allow for lower application temperatures. This is important where heat sensitive substrates are involved.

In addition, bond retention of Examples 1, 2 and 3 are significantly higher than the bond retention of H2598 at the same add-on levels both initially as well as after aging. Thus, the formulations of the present invention provide substantially lower viscosity with better creep resistance to that of currently available commercial high styrene SIS based elastic attachment adhesives.

TABLE 1

| Raw Material | | Example 1 | Example 2 | Example 3 | Control H2598 |
|---|---|---|---|---|---|
| Escorez 5600 | | 54.5 | 52 | 49.5 | |
| Plastolyn 290 | | 5 | 7.5 | 10 | |
| Taipol 4202 | | 23 | 23 | 23 | |
| Kaydol | | 17 | 17 | 17 | |
| Irganox 1010 | | 0.5 | 0.5 | 0.5 | |
| Viscosity at 160° C. | | 5900 cP | 5950 cP | 6450 cP | 8900 cP |
| Softening Point (° C.) | | 84.7 | 83 | 84.1 | 99.4 |
| Add-on level | | Bond Retention (%) | | | |
| 12 grams/sq. meter | Initial | 81.3 | 83.7 | 80.8 | 68.9 |
| | Aged 1 week at 40° C. | 84.9 | 81.3 | 82.7 | 67.9 |
| 18 grams/sq. meter | Initial | 84.3 | 84.1 | 88.4 | 79.0 |
| | Aged 1 week at 40° C. | 89.1 | 87.4 | 88.5 | 75.3 |

Example 2

Referring now to Table 2, Examples 4 and 5 are formulations made in accordance with the current invention. Examples 6 and 7 are the same formulation, except they use the SBS polymer described in U.S. Pat. No. 6,391,960 which is an SBS based polymer containing 30% styrene content by weight. Also, it should be noted that Example 7 is similar to formulation I-2 in Table I and Example II-2 in Table II in U.S. Pat. No. 6,391,960.

It should be noted from a comparison of the formulation of Example 4 with Example 6 and a comparison of the formulation of Example 5 with Example 7, it is apparent that the viscosity of the current invention (Examples 4 and 5) is significantly lower (approximately 4-6 times lower) than the prior art formulations of Examples 6 and 7 described in U.S. Pat. No. 6,391,960. As a result, the lower viscosity of the formulations of the current invention (Examples 4 and 5) allow them to be sprayed onto elastic strands at significantly lower temperatures (about 130° C. to about 150° C.) than Examples 6 and 7 of the prior art U.S. Pat. No. 6,391,960 (Examples 6 and 7) which had to be applied at 170° C. to 180° C. to achieve an acceptable spray pattern. Two different add-on levels, 15 and 18 grams per square meter were evaluated in Table Two. The other processing variables were the same as in Table One.

Also, it should be noted that the elastic attachment bond retention was comparable between the formulations of the current invention (Examples 4 and 5) and the prior art (Examples 6 and 7) even though the application temperature was 20° C. to 50° C. lower. In addition, the color stability of the formulations of the current invention (Examples 4 and 5) during elevated temperature storage (after aging at 177° C.) was much better than the prior art Examples 6 and 7 as demonstrated by the lower Gardner color numbers.

TABLE 2

| Raw Material | | Example 4 | Example 5 | Example 6 | Example 7 |
|---|---|---|---|---|---|
| Escorez 5600 | | 52.3 | 53.5 | 52.3 | 53.5 |
| Plastolyn 290 | | 7.4 | 10 | 7.4 | 10 |
| Taipol 4202 | | 22.9 | 18 | | |
| Europrene Sol T6302 | | | | 22.9 | 18 |
| Kaydol | | 16.9 | 18 | 16.9 | 18 |
| Irganox 1010 | | 0.5 | 0.5 | 0.5 | 0.5 |
| Brookfield Viscosity | 121° C. | 13350 | 25670 | 278000 | 137000 |
| | 135° C. | 18210 | 9830 | 108000 | 47060 |
| | 149° C. | 8880 | 4495 | 51125 | 21200 |
| | 163° C. | 4850 | 2380 | 28200 | 11080 |
| | 177° C. | 2950 | 1390 | 17050 | 6500 |
| Softening Point (° C.) | | 87.9 | 88.5 | 103 | 99.8 |
| Gardner Color (neat) | | 1 | 2.5 | 2 | 3.5 |
| Viscosity at 163° C. after aging at 177° C. in a glass jar | Initial | 4850 | | 28200 | 11080 |
| | 24 hours | 4825 | | 24710 | 9680 |
| | 48 hours | 4245 | | 21250 | 7150 |
| | 72 hours | 4030 | | 19750 | 5875 |
| | 96 hours | 3450 | | 17230 | 51060 |
| Gardner Color after aging at 177° C. in a glass jar | Initial | 1 | | 2 | 3.5 |
| | 24 hours | 1 | | 3 | 4 |
| | 48 hours | 1 | | 5.5 | 6.5 |
| | 72 hours | 1.5 | | 6.5 | 6.5 |
| | 96 hours | 2 | | 7.5 | 7.5 |
| Bond Retention after 4 hours at 100° F. (%) | | | | | |
| Add-on level | Application Temp | | | | |
| 15 gsm | 130° C. | | | 69.5 | |
| | 150° C. | 72.6 | | | |
| | 170° C. | | | 67.6 | 79.3 |
| | 180° C. | | | 72.7 | 77.1 |
| 18 gsm | 130° C. | | | 77.2 | |
| | 150° C. | 81.4 | | | |

TABLE 2-continued

| Raw Material | Example 4 | Example 5 | Example 6 | Example 7 |
|---|---|---|---|---|
| 170° C. | | | 70 | 80.7 |
| 180° C. | | | 72.9 | 80.3 |

Example 3

In order to demonstrate that not all SBS block copolymers having high styrene content function the same for purposes of the present invention, as well as the relative importance of molecular weight and polydispersity, reference is made to Tables 3 and 4 herein. Table 3 provides various properties for three different SBS block copolymers, namely, Stereon 842A, Taipol 4202, and Vector 4461.

TABLE 3

| | Stereon 842A | Vector 4461 | Taipol 4202 |
|---|---|---|---|
| Mn | 82650 | 83200 | 102400 |
| Mw | 124500 | 86100 | 108400 |
| PD | 1.506 | 1.034 | 1.059 |
| Structure | Multi-block | Linear ABA | Linear ABA |
| % Styrene | 43 | 43 | 40 |
| Diblock | NA | 0 | 0 |
| Melt Flow | 11.5 | 23 | 7 |
| Conditions | 200° C./5.0 Kg | 200° C./5.0 Kg | 190° C./5.0 Kg |

Table 4 illustrates the formulations tested.

height, then the percent flow would be 50%. Lower percentages are less desirable since low percentages directly correlates to undesirable flow of the test cube, and preferably, the test material remains at 100% during the entire test.

The results of the test are set forth numerically at the bottom of Table 4. At 100° F. for 48 hours, all four of the formulations are acceptable as the two formulations with Taipol 4202 remain at 100%, the two formulations with Stereon 842A remain at 96%, and the two formulations with Vector 4461 also remain at 96% of their original height. However, at 120° F. there are significant differences. The two formulas with Taipol 4202 are acceptable as example 1 has flowed to only 92.3% of its original height and example 2 has flowed to only 90% of its original height. However, the two Stereon 842A examples show severe cold flow which is unacceptable as the height of example 3 has been reduced to 48% and the height of example 4 has been reduced to 52% of its original height. Similarly, the two Vector 4461 examples also show severe cold flow as the height of example 5 has been reduced to 52% and the height of example 6 has been reduced to 61% of its original height.

As a result, it appears that in addition to a high styrene content of greater than 35% by weight, as well as the previously described melt flow index, cold flow value and polydispersity requirements, the linear SBS copolymer must also have a weight average molecular weight (Mw) of 100,000 or greater to function properly in the present formulation.

TABLE 4

| Raw Material | | Example 1 | Example 2 | Example 3 | Example 4 | Example 5 | Example 6 |
|---|---|---|---|---|---|---|---|
| Kaydol | Mineral Oil | 17.0 | 17.0 | 17 | 17 | 17.0 | 17.0 |
| Escorez 5600 | Hydrogenated aromatic modified DCPD resin | 59.5 | 52.0 | 59.5 | 52 | 59.5 | 52.0 |
| Plastolyn 290 | Fully aromatic reinforcing resin | | 7.5 | | 7.5 | | 7.5 |
| Taipol 4202 | Linear styrene/butadiene/styrene block copolymer | 23 | 23 | | | | |
| Stereon 842A | Styrene/butadiene multiblock copolymer | | | 23 | 23 | | |
| Vector 4461 | Linear styrene/butadiene/styrene block copolymer | | | | | 23 | 23 |
| Irganox 1010 | Hindered phenolic antioxidant | 0.5 | 0.5 | 0.5 | 0.5 | 0.5 | 0.5 |
| | Total | 100 | 100 | 100 | 100 | 100 | 100 |
| Cold Flow Test | | | | | | | |
| % Flow at 100° F./48 hours | | 100.0 | 100.0 | 96 | 96 | 96 | 96 |
| % Flow at 120° F./48 hours | | 92.3 | 90.0 | 48 | 52 | 52 | 61 |

Examples 1 and 2 utilize Taipol 4202, a linear SBS block copolymer, while examples 3 and 4 utilize Stereon 842A which is a styrene-butadiene multi-block copolymer, and examples 5 and 6 utilize Vector 4461 which is another linear SBS copolymer having 43% styrene content. Examples 1, 3 and 5 utilize a 0% end block resin while examples 2, 4 and 6 utilize 7.5% end block resin. However, the formulations are identical in all respects except for the use of Taipol 4202, Stereon 842A or Vector 4461.

Table 4 compares the formulations of examples 1-6 in a cold flow test. The cold flow test procedure is set forth previously herein. Essentially, the cold flow test measures the amount of dimensional change which takes place in a 1 cubic inch test sample at different temperatures. In other words, if the one inch cube test material does not flow, i.e. its measured height after heating for 48 hours is the same as its original height, then the percent flow is 100%. If, for example, the measured height of the cube after heating is ½ its original The disadvantage of cold flow to the extent that occurs with the two Stereon 842A examples, as well as the two Vector 4461 examples, is that such severe cold flow causes problems in packaging, where it limits the kind of packaging that can be used, especially in hot climates. Worse, it can cause problems with stability of the bonds formed in the products in which they are used. The bond strength of a hot melt adhesive preferably should not change during shipment and/or storage for a period of weeks and/or months at elevated temperatures. For example, if utilized in an elastic attachment application, such as a leg cuff in disposable diapers, cold flow of an adhesive at 120° F. would mean that the elastic in the diaper can creep since the elastic strands are under stress during storage resulting in a distorted and/or ineffective leg cuff for a disposable diaper which, in turn, results in decontainment of urine or fecal material during use on a baby. Thus, a formulation containing Stereon 842A or Vector 4461 would be unacceptable to disposable diaper manufacturers for use in elastic attachment applications.

We claim:

1. A hot melt adhesive composition, comprising consisting essentially of a blend of the following components;
   (a) about 5 to about 40 weight percent of a styrene-butadiene-styrene block copolymer, said styrene-butadiene-styrene block copolymer is a substantially linear styrene-butadiene-styrene block copolymer having a styrene content of about 38% by weight to about 50% by weight and essentially zero percent diblock, and a melt flow index of about 3 g/10 min to about 11 g/10 min at 190° C. with a 5 kg weight, and a polydispersity of about 1.01 to about 1.30, and has a weight average molecular weight of 100,000 or higher;
   (b) about 2 to about 30 weight percent of an endblock resin wherein the end-block resin has a softening point of from 100 to 160° C.;
   (c) about 20 to about 70 weight percent of a tackifier;
   (d) about 0 to about 25 weight percent of a compatible non-functionalized block copolymer;
   (e) about 0 to about 30 weight percent of an oil; and
   (f) about 0 to about 4 weight percent of an antioxidant;
   wherein the tackifier is present in an amount greater than the block copolymer and wherein the components total 100% by weight of the composition so that the adhesive has a viscosity less than 10000 cP at 325° F., and a cold flow value equal to or greater than 70% at 49° C. after 48 hours.

2. The composition of claim 1 wherein said block copolymer is present in an amount of from about 10% to about 30% by weight.

3. The composition of claim 2 wherein said block copolymer has a styrene content of at least about 38% by weight and a solution viscosity of less than 1000 centipoise.

4. The composition of claim 1 wherein said block copolymer is present in an amount of from about 15% to about 25% by weight.

5. The composition of claim 1 wherein said composition has a viscosity equal to or less than 8000 cP at 325° F.

6. The composition of claim 1 wherein the end-block resin is a product from pure monomer polymerization.

7. The composition of claim 1 wherein the end-block resin has a softening point of from 100 to 140° C.

8. The composition of claim 1 having about 40% to about 65% by weight of said tackifier.

9. The composition of claim 1 having about 50% to about 62% by weight of said tackifier.

10. The composition of claim 1 wherein said composition has an initial elastic attachment bond retention of at least about 70%.

11. The composition of claim 1 wherein said composition has an initial elastic attachment bond retention of at least about 80%.

12. The composition of claim 1 further having a one-week-aged elastic attachment bond retention of at least about 50%.

13. The composition of claim 1 further having a one-week-aged elastic attachment bond retention of at least about 70%.

14. The composition of claim 1 wherein the mid-block tackifying resin is selected from the group consisting of aliphatic hydrocarbon resins and their hydrogenated derivatives, hydrogenated cycloaliphatic hydrocarbon resins, aromatic modified aliphatic or hydrogenated cycloaliphatic hydrocarbon resins, aliphatic modified aromatic hydrocarbon resins, partially or fully hydrogenated aromatic hydrocarbon resins, polyterpene, rosin ester and styrenated polyterpene resins.

15. The composition of claim 1 wherein said oil is selected from the group consisting of mineral oil and liquid polybutene.

16. The composition of claim 1 wherein said styrene-butadiene-styrene block copolymer has a melt flow index of about 3 g/10 min to about 8 g/10 min at 190° C. with a 5 kg weight.

17. The composition of claim 1 wherein said composition has a cold flow value equal to or greater than 80%.

18. The composition of claim 1 wherein said composition has a cold flow value equal to or greater than 90%.

19. The composition of claim 1 wherein said styrene-butadiene-styrene block copolymer has a polydispersity of about 1.01 to about 1.20.

20. The composition of claim 1 wherein said styrene-butadiene-styrene block copolymer has a polydispersity of about 1.01 to about 1.10.

* * * * *